March 26, 1957 R. BIERL 2,786,941

OSCILLATING CIRCUIT FOR AUDIO FREQUENCY GENERATORS

Filed Jan. 23, 1953 3 Sheets-Sheet 1

Inventor
Richard Bierl
by
Stevens, Davis, Miller & Mosher
his attorneys

OSCILLATING CIRCUIT FOR AUDIO FREQUENCY GENERATORS

Filed Jan. 23, 1953 3 Sheets-Sheet 2

Inventor
Richard Bierl
by
Stevens, Davis, Miller & Mosher
his attorneys

Inventor
Richard Bierl
by
Stevens, Davis, Miller & Mosher
his attorneys 2,786,941

OSCILLATING CIRCUIT FOR AUDIO FREQUENCY GENERATORS

Richard Bierl, Trossingen, Germany, assignor to Matthias Hohner, Aktiengesellschaft, Trossingen, Germany, a German company Application January 23, 1953, Serial No. 332,855

Claims priority, application Germany January 29, 1952

11 Claims. (Cl. 250—36)

Attempts have already been made in the field of generating audio frequency oscillations to provide for the creation of predetermined frequency intervals, as such a graduation is of great importance in relation to the design of electronic musical instruments. It has been known that the desired frequency intervals may be obtained by subdividing the capacity of the oscillating circuit in a suitable manner and by selectively interconnecting the capacities thus obtained. It has further been known that it is possible to provide for frequency modulation of the sounds (vibrato) by providing a reed made of a suitable ferromagnetic material, this reed performing vibrations of greater or smaller amplitude and being arranged near the ferromagnetic core of an elongated coil connected in the oscillating circuit.

However, the known means just described do not meet the requirements made of an oscillating circuit of the kind described and intended for use in audio frequency generators, these considerations applying especially for electronic musical instruments in which case special requirements have to be met as regards a satisfactory tempering (intonation or tuning) of the instrument. Moreover, the means heretofore known have failed to provide for the necessary pitch control in combination with the use of audio frequency modulation, the same being true for a simultaneous increase in range (octave shift).

The oscillating circuit according to the invention permits completely to eliminate the deficiencies of the known oscillating circuits of the class described as far as the above-mentioned characteristics are concerned. As regards the said pitch control and audio frequency modulation effects this is made possible according to the invention by providing in the substantially closed ferromagnetic core of the oscillator coil at least one air gap within which the magnetic flux may be controlled by means of one oscillating armature and one armature which is adapted to assume a predetermined position. According to the invention the increase in the range of frequencies (by means of octave shift) is provided for either in combination with the provisions just described or, under certain circumstances, independently of the described provisions by subdividing the said oscillator coil into at least two sections arranged for being selectively connected in parallel or in series. In a preferred embodiment of the said provisions according to the invention the said oscillator circuit is used in a push-pull circuit since this arrangement makes it possible not only to eliminate any phase distortion in the feedback circuit but also to prevent the oscillator circuit from being thrown out of pitch and to provide for a minimum load imposed on the oscillator circuit.

Figure 1:
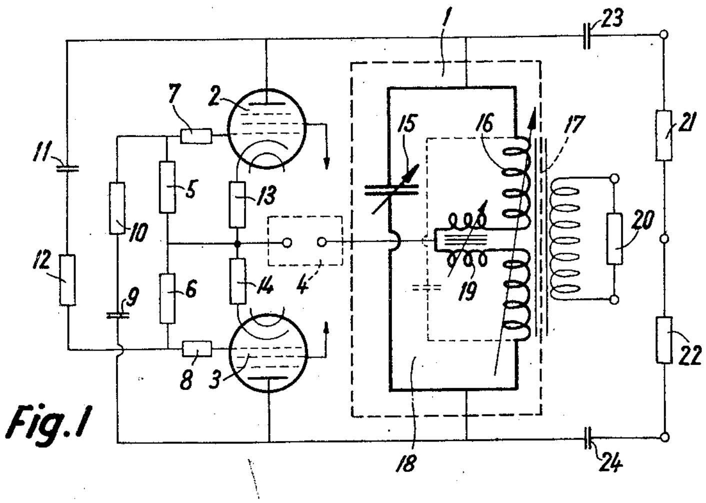
Figure 2:
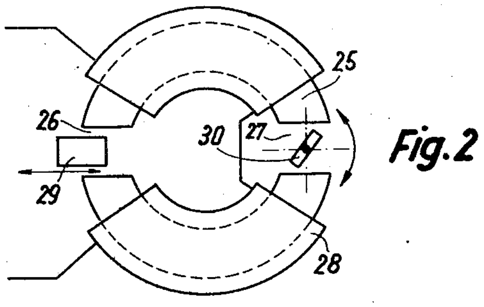
Figure 3:
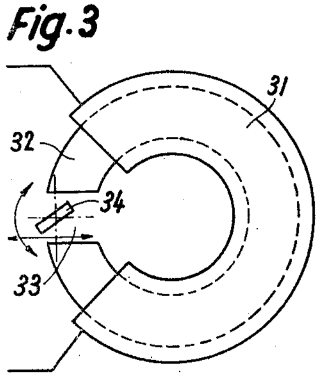
Figure 4:
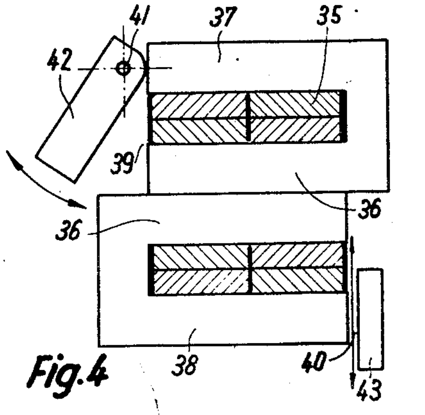
Figure 5:
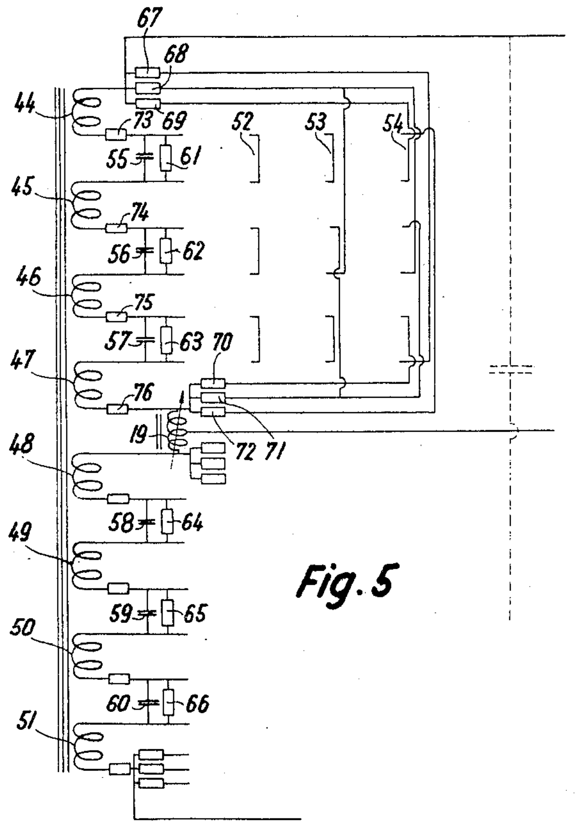
Figure 6:
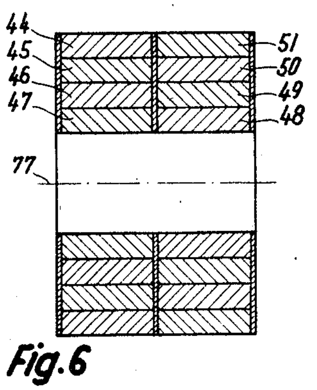
Figure 7:
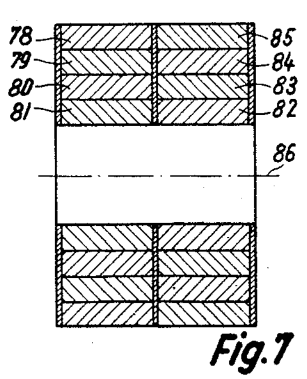
Figure 5A:
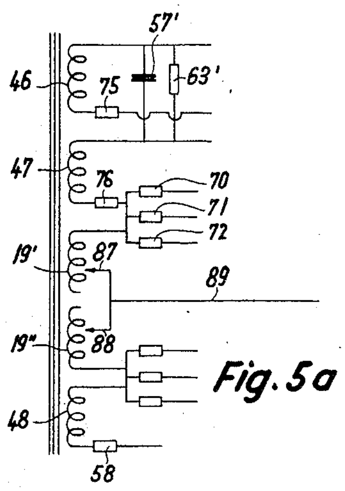

Additional characteristic features of the invention will become apparent from the following description taken in conjunction with the accompanying drawings. In the following, the individual characteristic features of the invention are exemplified by one or more embodiments. Fig. 1 represents the wiring diagram, according to the invention, of an oscillator circuit for an audio frequency generator, a push-pull circuit being used in this case; also shown in Fig. 1 are methods of either inductively or capacitively coupling the load circuits. Fig. 2 shows one embodiment of the coil of the oscillator circuit, the substantially closed ferromagnetic core of the coil in this case being provided with two air gaps. Fig. 3 represents an embodiment of the said coil in which the substantially closed ferromagnetic core is provided with one air gap only. Fig. 4 illustrates an embodiment of the said coil in which the iron core extending through the said coil comprises two separate, substantially closed extensions each of which is provided with one air gap. Fig. 5 shows the wiring of a coil subdivided into a plurality of sections, the wiring in this case being so arranged as to permit the said sections to be selectively connected in parallel or in series. Fig. 5*a* shows a slight modification of the embodiment illustrated in Fig. 5. Figs. 6 and 7 are representations of the arrangement of the said coil sections, including one arrangement in which the individual coil sections have been transposed for a purpose to be dealt with as the description proceeds.

As will be seen from Fig. 1, the oscillator circuit 1 is connected in a push-pull circuit, the electronic valves 2, 3 of which are supplied with an operating voltage by the source 4. Connected in the grid circuits of the electronic valves 2, 3 are the grid leak resistances 5, 6 and the additional drop resistances 7, 8. The grid circuit of the electronic valve 2 is connected to the plate of the electronic valve 3 by way of the condenser 9 and, where desired, by way of the resistance 10, while the grid circuit of the electronic valve 3 is connected to the plate of the electronic valve 2 by way of the condenser 11 and, where desired, by way of the resistance 12. It may be of advantage to provide in the plate circuits of the electronic valves 2, 3 the self-bias resistances 13 and 14, respectively, these resistances serving to limit the operating direct-current voltage.

The oscillator circuit 1 substantially comprises the variable condenser 15 and the variable coil 16 which has a ferromagnetic core 17, the said coil being of a design which will hereinafter be more fully described. The self capacity of the said coil, including the wiring capacity, is indicated by the shunt capacity 18. Connected to that terminal of the coil 16 at which there does not occur any alternating voltage is the balancing or adjusting coil 19 the central tap of which is connected to the positive pole of the operating voltage source 4. It is also possible to provide on the existing core which all coils have in common the two additional coil sections 19′ and 19″, each of the said coils being connected to the positive pole 4 of the operating voltage source by way of the adjustable taps 87, 88 (Fig. 5*a*) and by way of the wire 89. In the circuit just described, provisions may also be made for the taps 87 and 88, together with the circuit connections 52, 53 and 54 to be described later, to be operated by a cam drum also to be described later. The load circuits which may, for example, be constituted by the grid circuit of an amplifier circuit, are indicated by the symbolic resistances 20 to 22, the said load circuits being connected either inductively (20) or capacitively (21, 22) by way of the condensers 23 and 24, respectively.

From the foregoing it will be seen that the oscillator circuit 1 is loaded by the external load resistance 20 or 21, 22, respectively, and the grid circuit resistance 5 or 6, respectively, there being connected in the circuit a barrier resistance 7 or 8, the magnitude of the latter resistance being such that the resulting total load resistance exceeds the resistance of the oscillator circuit 1. The circuit arrangement just described offers a particular advantage in that it reduces grid leakage losses to a minimum.

In Fig. 2, which shows the construction of the coil 16 indicated in Fig. 1, it will be seen that the substantially closed ferromagnetic core 25 is provided with the air gaps 26 and 27. The said core is provided with the coil 28. In order to provide for the hereinbefore mentioned pitch control, there is provided in the air gap 26 the armature 29 which is arranged for adjustment in a transverse direction; in order to provide for the desired audio frequency modulation, there is provided in the air gap 27 the armature 30 which is arranged for rotation about an axis perpendicular to the drawing plane.

The modified coil 16 represented in Fig. 3 has its winding 31 arranged on a substantially closed ferromagnetic core 32 in which in this case only one air gap 33 is provided. The armature 34 is arranged in the said air gap for both movement in a transverse direction and rotation about an axis perpendicular to the drawing plane. It is evident from the foregoing that in this case a pitch control effect as well as an audio frequency modulation effect is obtained by means of a single armature 34 which is arranged in such a manner that it may perform two distinct superimposed motions.

In the case of the coil 16 shown in Fig. 1 of which Fig. 4 represents another embodiment, the iron core 36 extends through the winding 35. The said core is provided with the two substantially closed extensions 37 and 38 having the air gaps 39 and 40, respectively. In the case of the arrangement just described, the pitch control is provided for by the armature 42 mounted for rotation about the axis 41, while audio frequency modulation is provided for by the oscillating armature 43.

Fig. 5 illustrates the manner in which the coil 16 shown in Fig. 1 is subdivided into the sections 44 to 51. The said sections are arranged on the common core 17. As has already been mentioned, the balancing or adjusting coil 19 is connected to that terminal of the oscillating circuit coil at which there does not occur any alternating voltage. The central tap of the balancing coil is connected to the positive pole of the operating voltage source (4 in Fig. 1) not shown in Fig. 5. The coil sections 44 to 51 may be selectively connected in parallel or in series by a cam drum arranged to establish the connections 52, 53 and 54 as required. With the connection 52 closed, all coil sections are connected in series. In the case of connection 53 the pairs of coil sections 44, 45 and 46, 47, respectively, are each connected in series, the groups thus formed being connected in parallel. When the connection 54 has been established, all coil sections 44 to 47 are connected in parallel. The same considerations apply for the connection of the coil sections 48 to 51 in the case of the different connections 52, 53 and 54. Connected between pairs of coil sections 44 to 47 and 48 to 51, respectively, are circuit elements consisting of the condensers 55 to 57 and 58 to 60, respectively, and of resistances connected in parallel with the said condensers, the said resistances being indicated by reference numerals 61 to 63, 64 to 66 and 57', 63' (Fig. 5*a*). The said circuit elements serve the purpose of balancing the total wiring capacity and the total resistance load between the switch positions 52 and 53 (56, 62) and between the switch positions 53 and 54 (55, 61 and/or 57, 63). It will be noted that the ratio between the total load resistance and the circuit impedance ($\sqrt{L/C}$) remains constant regardless of the switch position used.

The external ends of the outer coil sections 44, 47 are fork-connected to the circuit branches containing the resistances 67, 68, 69 and 70, 71, 72, respectively. A corresponding circuit arrangement is provided in the case of the coil sections 48 and 51. It is intended by using these branch resistances in cooperation with the resistances 73 to 76 to provide for the ratio between the total loss resistance acting in series with the inductive resistance on the one hand and the oscillator circuit resistance on the other to be kept constant regardless of the switch position used.

In the circuit arrangement represented in Fig. 6 the coil sections 44 to 47 of the first half of a push-pull circuit and the coil sections 48 to 51 of the second half of the same push-pull circuit are arranged concentrically in relation to the axis 77 of the coil (16 in Fig. 1). In order to provide for a closer magnetic coupling, that is to say, for a reduction in losses caused by scatter leakage, the connections of the coil sections 44, 51 and 46, 49, respectively, may be transposed.

In the circuit arrangement represented in Fig. 7 the individual windings 78, 79—80, 81—82, 83 and 84, 85 of the coil sections 44 to 47 are arranged concentrically in relation to the axis 86 of a coil connected in an audio amplifier stage. In order to reduce the losses caused by scattering effects, any two corresponding individual coils of the said coil sections, such as 78 and 85, 80 and 83, 78 and 80, or 85 and 83, may be transposed.

I claim:

1. Oscillator circuit for audio frequency generators, preferably for electronic musical instruments, consisting of a selectively interconnectable condenser group and a single coil whose magnetic circuit is composed of a ferromagnetic core and at least one air gap, and including an armature capable of being preset in one of said air gaps and an armature capable of oscillating in one of said air gaps.

2. Oscillator circuit for audio frequency generators, preferably for electronic musical instruments, consisting of a selectively interconnectable condenser group and a single coil whose magnetic circuit is composed of a ferromagnetic core and at least one air gap, and including an armature provided in said air gap capable of being preset in the air gap as well as oscillating therein.

3. Oscillator circuit for audio frequency, preferably for electronic musical instruments, according to claim 1, consisting of a selectively interconnectable condenser group and a single coil having a magnetic resistance divided into two parts, wherein each part consists of a ferromagnetic extension lying inside and outside of the coil, an air gap as well as the armature provided in said air gap, the latter being arranged at different parts of the coil.

4. Oscillator circuit for audio frequency generators, preferably for electronic musical instruments, consisting of a selectively interconnectable condenser group and a coil with an essentially closed ferromagnetic core, according to claim 3, having a coil winding divided into at least two sections, as well as switching means with which the combined coil sections can be selectively connected in series and in parallel.

5. Oscillator circuit according to claim 4 wherein switching elements consisting of condensers and ohmic resistances are provided at least between two coil sections.

6. Oscillator circuit according to claim 4, wherein condensers are provided at least between two coil sections.

7. Oscillator circuit according to claim 4, wherein at least $2^n$ coil sections are provided with $n$ taking any desired integral value greater than unity.

8. Oscillator circuit according to claim 4, comprising bifurcated conductors provided at least at the outwardly facing ends of the outer coil sections, and ohmic resistances in the branches of the said bifurcated conductors.

9. Oscillator circuit according to claim 1, further including an additional balancing coil, said coil being connected at the end of the oscillator circuit coil at which no alternating voltage occurs.

10. Oscillator circuit according to claim 4, wherein each coil section consists of $2^m$ coaxial single windings, with $m$ taking any desired integral value, and wherein the terminals of the corresponding single windings of the coil section are interchanged.

11. Oscillator circuit according to claim 1, further including a load, the load consists of an external load resistor formed of electronic valve switching means with drop resistances and damping resistances, and wherein the oscillator circuit resistance is smaller than the total load resistance.

References Cited in the file of this patent

UNITED STATES PATENTS

| | | |
|---|---|---|
| 354,274 | Thomson | Dec. 14, 1886 |
| 1,559,802 | Stevenson | Nov. 3, 1925 |
| 1,831,886 | Ross | Nov. 17, 1931 |
| 1,957,392 | Copleux | May 1, 1934 |
| 2,354,331 | Polydoroff | July 25, 1944 |
| 2,594,749 | Ehrat et al. | Apr. 29, 1952 |